June 3, 1958

J. C. NAILEN 2,837,652

SOLID STATE INVERTERS

Filed Jan. 7, 1957

3 Sheets-Sheet 1

INVENTOR.
JAMES C. NAILEN
BY Harry R. Lubcke
AGENT

June 3, 1958 J. C. NAILEN 2,837,652

SOLID STATE INVERTERS

Filed Jan. 7, 1957 3 Sheets-Sheet 2

INVENTOR.
JAMES C. NAILEN
BY Harry R. Lubcke
AGENT

INVENTOR.
JAMES C. NAILEN
BY Harry R. Lubcke
AGENT

United States Patent Office 2,837,652 Patented June 3, 1958

2,837,652

SOLID STATE INVERTERS

James C. Nailen, Los Angeles, Calif., assignor to Electronic Specialty Co., Los Angeles, Calif., a corporation of California Application January 7, 1957, Serial No. 632,907

17 Claims. (Cl. 250—36)

My invention relates to means to convert direct current electrical energy to alternating current electrical energy and particularly to static means employing two-electrode solid-state devices for this purpose.

The advantage of eliminating rotating machinery, vacuum tubes and even three terminal devices such as transistors from a device for effecting A. C. to D. C. conversion is immediately apparent. I have found that a two terminal solid state interface exhibits negative resistance. This is because of a hysteresis characteristic in the Zener region having an open loop.

The electronic mechanism is similar to the known action of the gaseous discharge tube, wherein the extinction potential is less than the ignition potential. Analogously, my semiconductor interface generates relaxation-type oscillations when associated with a capacitor. By incorporating inductive reactance in the circuit I am able to produce quasi-sinusoidal oscillations at a frequency determined by the resonant frequency of the inductive and capacitative reactances. By providing a harmonic elimination filter, voltage feedback means and transformer means I am able to provide stable alternating current of essentially sinusoidal waveshape at desired voltages from direct current electrical energy.

Insofar as I am aware the prior art has not known that it was possible to produce a solid state rectifying interface having my negative resistance open-loop characteristic. However, by means to be described herein I have obtained functioning in accordance with such characteristic and have observed the same per se in oscilloscopic tests capable of displaying the hysteresis loop. Oscillations in the frequency range of from 1/10 cycle per second to several megacycles per second have been obtained. These data preclude a thermal diode mode of operation, for this would be at essentially a fixed frequency.

My inverter finds application in the numerous places where alternating current is required and direct current electrical energy is the prime source available. It is particularly useful in airplanes and missiles where I am able to provide a hermetically sealed device suited to operation in rarified air and under conditions of temperature extremes. The power output obtainable from conventional diodes having a junction measured in millionths of a millimeter diameter is only a few watts. The efficiency is approximately 50% With adequately cooled larger diodes having a junction of the order of a millimeter diameter the power output approaches 100 watts.

Briefly describing my invention, I arrange a Zener diode in a self-oscillating relaxation circuit, preferably two or more diodes in series for nearly coincident breakdown, with one such series for each half of the alternating waveform desired; i. e., two groups for single phase full wave and six groups (series) for three phase. A capacitor and an inductor are arranged to function with each group of diodes to form the oscillating circuit. The inductor may also be the primary of a transformer for increasing or decreasing the voltage of the alternating current output with respect to that of the direct current input. Phasing means are arranged to trigger off successive half cycles, and successive phases in proper sequence if the inverter be multi-phase.

Series resonant circuits tuned to harmonics of the fundamental operating frequency are connected across the output of the inverter per se to remove the harmonics and thus to improve the relaxation waveshape to essentially a sinusoidal one. Means may be provided to utilize this harmonic energy for non-critical loads such as lamps and resistive devices. A magnetic amplifier regulator is connected to the A. C. output and is arranged to feed back energy to the inverter diodes to keep the output voltage and frequency within desired limits. Various embodiments are disclosed, from a simple half-wave device to a multiphase full-wave regulated inverter.

An object of my invention is to provide a static D. C. to A. C. inverter utilizing a simple solid state component.

Another object is to provide an inverter in which oscillations are generated because of the negative resistance of a semiconductor diode.

Another object is to provide an inverter having a relatively few solid state and reactive elements.

Another object is to provide an inverter that may be completely hermetically sealed.

Another object is to provide an inverter capable of being fabricated to supply an alternating current adjustable as to frequency over a large range.

Another object is to provide an inverter having essentially sinusoidal A. C. output and having voltage and frequency stabilization.

Another object is to provide a multi-phase inverter.

Other objects of my invention will become apparent upon reading the following detailed specification and upon examining the accompanying drawings, in which.

Figure 3:
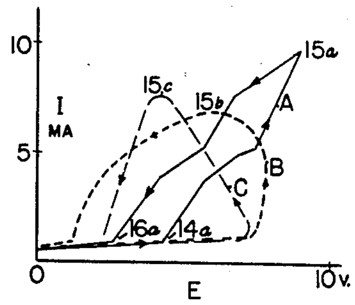
Figure 4:
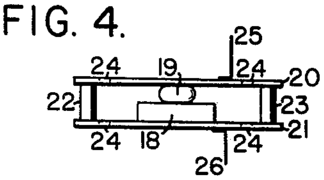
Figure 5:
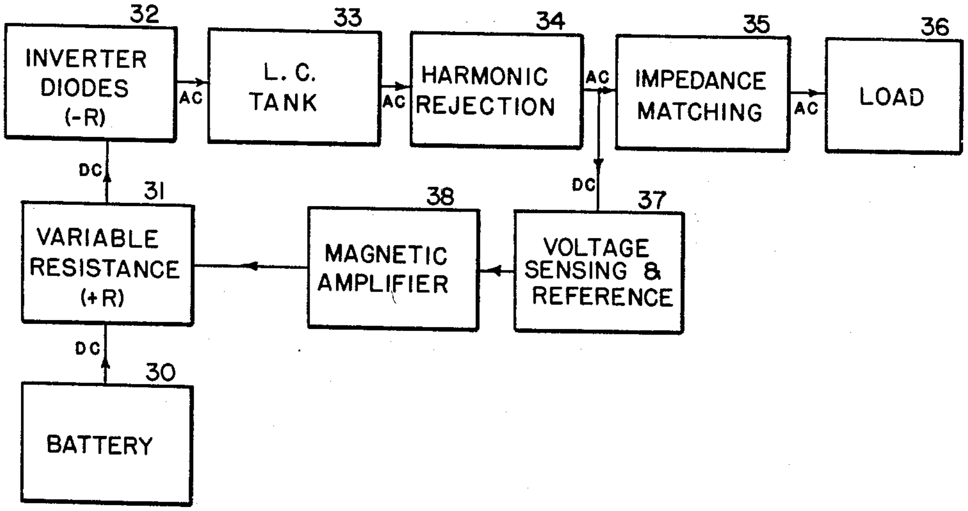
Figures 6, 7, 8:
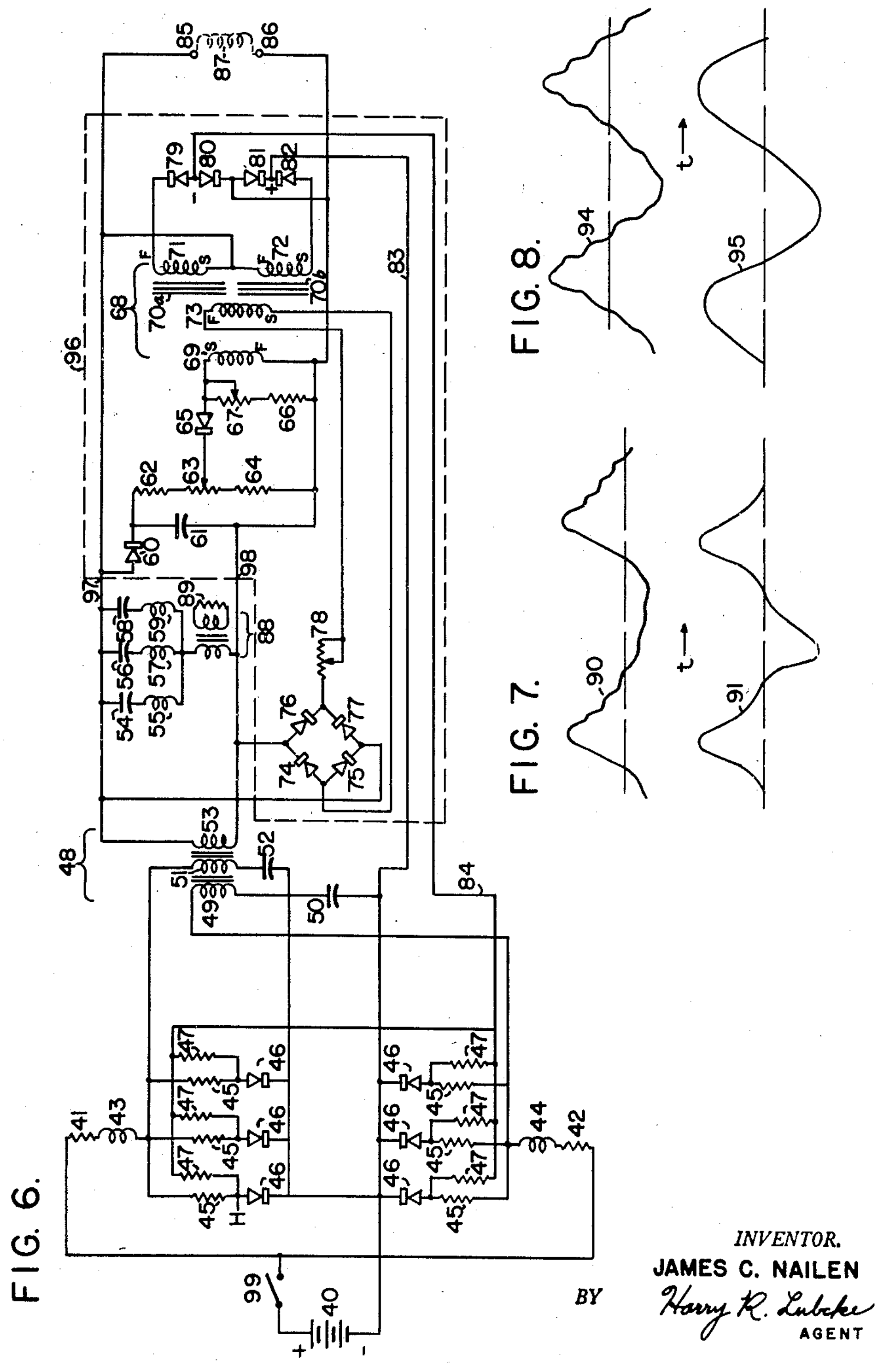
Figures 9, 10, 11:
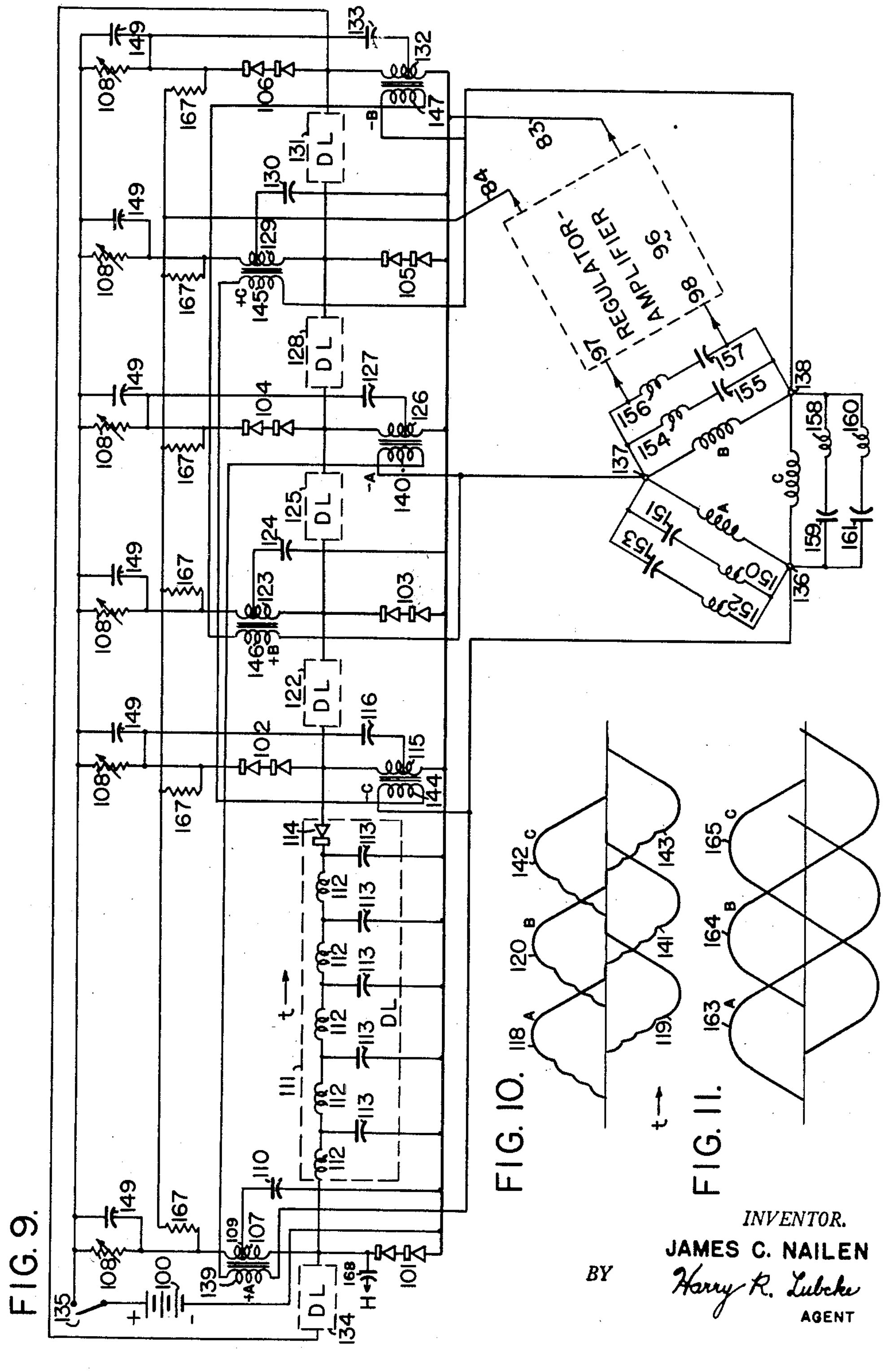

Fig. 3 shows typical hysteresis curves for solid state diodes according to my invention, Fig. 4 shows the mechanical construction of a Zener diode according to my invention, Fig. 5 shows the block diagram for a complete inverter apparatus, Fig. 6 is the schematic diagram of a single phase form of my apparatus, Fig. 7 shows the oscillation waveforms of single phase apparatus, Fig. 8 shows the filtered output waveforms of my single phase apparatus, Fig. 9 is the schematic diagram of a three phase form of my apparatus, Fig. 10 shows the oscillation waveform of three phase apparatus, and Fig. 11 shows the filtered output waveforms of my three phase apparatus.

Figure 1:
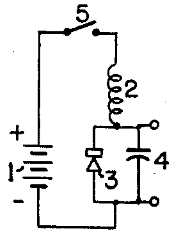
Fig. 1 shows a basic diode oscillator circuit of my invention.

In Fig. 1 numeral 1 indicates the prime source of direct current electrical energy, such as a battery of the storage type. Inductor 2 is in series with solid state or semiconductor diode 3 across battery 1, while capacitor 4 is shunted across the diode. An on-off switch is represented at 5.

Assume that the switch 5 has been open and that capacitor 4 is discharged. When the switch is closed the capacitor starts to charge through the inductor. As the potential across the capacitor rises it also does across the diode. This causes a relatively small saturation current to flow at first through the diode, but at a higher potential a Zener avalanche current of large value flows, being somewhat independent of potential as long as the diode is in the Zener region. This larger current partly discharges the capacitor. Because of the open loop of the hysteresis curve of the diode the extinction potential of the Zener current is lower than the ignition potential thereof. Thus, current flows from the capacitor until the extinction potential of the diode is reached. Thereafter the capacitor starts to charge again and the cycle is repeated. The cycle is timed by the resonant frequency of the inductance and capacitor and the alternating voltage that appears across the latter may be connected to an alternating current load.

Figure 2:
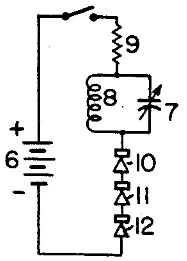
Fig. 2 shows another basic diode oscillator circuit of my invention.

Fig. 2 shows an alternate schematic diagram for my inverter, also being of the single-ended type as in Fig. 1. In Fig. 2 capacitor 7 is in shunt with inductor 8. Although this appears to be a considerable departure from Fig. 1 this is not so because a battery is the alternating current equivalent of a very large capacitor. In Fig. 1, then, the lower plate of capacitor 4 is, in effect, connected to the upper terminal of inductor 2 (when switch 5 is closed).

In Fig. 2 a current limiting resistor 9 is shown in series with the battery. This prevents overloading the diodes. In Fig. 1 the inherent resistance of inductor 2 performed this function. Capacitor 7 is shown variable in Fig. 2 in order that the frequency of the alternating current produced may be adjusted.

In Fig. 2, also, I have shown plural diodes connected in series; i. e., diodes 10, 11, and 12. This group, or series string, acts in the circuit almost the same as a single diode. As the voltage rises across the series string the diode having the lowest Zener avalanche voltage changes from essentially non-conducting to fully conducting. As soon as this happens, the voltage drop across that diode decreases, thus the voltage drop across the rest increases. The diode having the next higher Zener breakdown voltage then fires, and so on, all this happening quite rapidly and at relatively small voltage increases. The output is increased over that for a single diode because the resultant wave is a step function simulating a half sine wave rather than a sawtooth waveshape.

While not limiting my invention in any way, I have found that oscillation for the inverter action can be obtained with values of capacitance for capacitor 7 of from 1 millimicrofarad to 100 microfarads, of inductance for inductor 8 of from 1 millihenry to 1,000 henries, and of resistance 9 from 1,000 to 100,000 ohms. The resistance value is for the small receiving type diodes (10, 11 and 12). For larger diodes constructed according to my invention as per Fig. 3 the resistance values are very much smaller.

For aircraft and missile use 400 cycles is a desirable alternating current frequency. To obtain this frequency in the apparatus of Fig. 2 a capacitance of 0.6 microfarad and an inductance of 0.2 henry is used.

The circuit of Fig. 2 emphasizes that the oscillation of the Zener diode current is a negative resistance phenomenon. The circuit elements 7, 8 and 9 have positive resistance. Unless the negative resistance generated by the diodes exceeds this positive resistance the circuit would not oscillate.

In Fig. 3 illustrative hysteresis curves taken from tests are shown. Curve A is for silicon, curve B is for germanium and curve C is for a highly altered silicon which includes an element in group III or group V in the periodic table as a mixture in the silicon. The open loops are apparent. For silicon, with increasing voltage (abscissa) the Zener current does not start until point 14*a* is reached at approximately 5 volts. The current then rises rather rapidly according to an avalanche path pattern. This is due to a metastable orbitual electron configuration which allows cumulative electron flow without permanent ionization. The rise for this small diode was to approximately 10 milliamperes at 10 volts, point 15*a*. On the return path a lower voltage brings about given current values; for example, 3½ volts at point 16*a* in order to extinguish the Zener current. With higher voltage diodes the hysteresis loop is of the same general nature. The germanium curve B is seen to have a relatively open loop, while the altered silicon curve C has somewhat the area of curve B but somewhat the silicon shape. Silicon has an upper temperature rating of 300° C., being best suited for aircraft and missile use where high operating temperatures are to be encountered.

We now turn to Fig. 4, which shows a Zener power diode according to my invention. It is of the grown silicon junction type and much larger than the usual non-power size. The silicon is represented by numeral 18, while 19 is the junction material; either group III or group V in the periodic table. In group III indium is representative and in group V arsenic or bismuth are representative. It is to be noted that the electrical polarity of the diode reverses depending upon what group is employed. Electrons flow from a group III metal to the base of silicon, but from the base of silicon to group V metals.

The prior art has invariably sought to raise the Zener voltage of semi-conductor diodes, for the reason that the usual operating range must lie below that avalanche voltage. This is raised by forming junctions of the highest purity attainable. This is most readily accomplished by growing small junctions. I require a low Zener voltage, for with such the Zener current is larger and thus better adapted for power inverter action. The Zener voltage is lowered by impurities. Because large junctions and impurities go hand in hand I can easily realize my diodes.

Plates 20 and 21 are of the order of 3 cm. square copper or aluminum in a typical embodiment. The plates serve as electrodes and as cooling fins. I prefer to hold the plates in alignment by two or more small insulating rods 22, 23 of mycalex or a ceramic capable of withstanding nominal heat. Numeral 24 denotes a plurality of tapped holes used for fastening the diode to a still further heat sink and/or to other diodes for the series string connection. Alternately, leads 25 and 26 are welded or silver soldered to one side of each plate so that unnecessary heat is not applied to the semiconductor materials in subsequent fabrication of the inverter.

While the circuits of Figs. 1 and 2 are suitable for practical operation as single-ended inverters, a push-pull inverter with coacting control circuits is shown in the block diagram of Fig. 5. Therein, numeral 30 represents the battery or other source of direct current, the energy of which is to be converted to alternating current. Element 31 is a current limiting resistor having an effective variable positive resistance because of the functioning of voltage regulating components to be described later. Direct current electrical energy passes next to semiconductor inverter elements 32, these representing a negative resistance. In combination with inductor-capacitor resonant (tank) circuit 33, elements 32 form alternating current electrical energy. To provide alternating current of substantially sinusoidal waveshape a harmonic rejection filter 34 is provided subsequent to the tank circuit to remove harmonic energy. Thereafter, a transformer circuit 35 matches the impedance of the inverter to that of the useful load 36, which latter is comprised of alternating current operated devices not a part of my apparatus per se. In order to obtain automatic voltage and frequency control, voltage sensing and reference elements 37 are provided. The control energy developed therein is amplified by magnetic amplifier 38 and fed back to resistive control element 31.

Considering an inverter of this type in greater detail by means of the schematic diagram of Fig. 6, battery 40 is the prime source of direct current electric power. The positive terminal thereof, for instance, passes through on-off switch 99, divides and passes through symmetrically situated current limiting resistors 41, 42 and auxiliary inductors 43, 44. In a representative low power embodiment the value of the resistors may be of the order of 10 ohms each and of the inductors of the order of 10 millihenries each. Next in circuit are anti-parasitic resistors 45 of a few ohms resistance each, connected in series with the semiconductor diodes 46, of which three are shown in parallel on each side of the push-pull circuit as a representative plurality. The opposite terminal of each diode is connected via a common return circuit to the other terminal of battery 40. The diodes are preferably those of power proportions as illustrated in Fig. 4. Associated with the diodes in Fig. 6 are further resistors 47 having a relatively high resistance value of the order of 100,000 ohms. These are a part of the automatic voltage control circuit.

We now consider push-pull to single-ended transformer 48. Primary 49 has a realizable value of self-inductance of the order of 10 millihenrys and is connected in series with capacitor 50, having a capacitance of the order of 10 microfarads. The ratio of inductive reactance to resistance, or "Q," of primary 49 is relatively high, of the order of 40. Primary 49 and capacitor 50 constitute a series resonant circuit. This determines the frequency of the alternating current produced, of the order of 400 cycles in this embodiment. A second primary 51 and second capacitor 52 are equivalent in all respects to those first mentioned and perform the same function for the opposite side of the push-pull circuit. The diodes 46 of the opposite side of the push-pull circuit are triggered from non-conduction to conduction in correct phase through the coupling of primaries 49 and 51 of transformer 48.

Secondary 53 of the transformer characteristically has more turns than each of the primaries to give a step-up voltage ratio to, for instance, 117 volts R. M. S. A. C. voltage at the output terminals of the inverter.

Across secondary 53 there are connected a plurality of series resonant circuits 54, 55; 56, 57; 58, 59; etc., each comprised of a capacitor and inductor of different reactive value than the others. Thus, the first combination may be resonant to the third harmonic of the fundamental 400 cycle frequency, i. e., 1,200 cycles; the second combination to the fifth harmonic, i. e., 2,000 cycles; and the third combination to the seventh harmonic, i. e., 2,800 cycles, and so on. Because of the push-pull nature of the inverter I have found that only the odd harmonics require treatment and that suppression of up to the seventh accomplishes a sufficiently pure sine waveshape for the fundamental for all inverter purposes. The series resonant circuits act as a short-circuit across the transformer 48 for the harmonics to which these are tuned but do not affect energy at the fundamental frequency. The function of transformer 88 will be described later.

Diode 60 rectifies the voltage output from the inverter proper, capacitor 61 filters the same to substantially D. C. and resistors 62, 63 and 64 comprise a potentiometer thereacross. Resistor 63 is variable and constitutes the voltage control of the inverter available to the operator by means of which the voltage of the alternating current output may be adjusted as desired. An automatic circuit to be further described maintains that voltage constant over considerable variations of other parameters, chief among which is the voltage of battery 40.

Another diode, 65, is a voltage sensing diode operated into the Zener region. This provides a reference for the magnetic amplifier as to whether equivalent resistance should be added or subtracted to the inverter diode circuits. Resistor 66 has a negative temperature coefficient of resistance and is in series with variable resistor 67 across the output of diode 65. Resistor 66 compensates the control circuit for ambient temperature variations. In airborne and military equipment such variations may be extreme, as is known. Resistor 67 alters the degree of negative temperature compensation and requires only very infrequent adjustment.

Generic element 68 comprises the inductive portion of a magnetic amplifier. Winding 69 on cores **70*a* and 70*b* introduces the control of voltage aspect of the circuit. Winding 71 on core 70*a* and winding 72 on core 70*b* comprise the basic magnetic amplifier circuit and are connected symmetrically across the A. C. output of the inverter. Winding 73 upon both cores 70*a* and 70*b* introduces the bias current to the magnetic structure. The bias arises from bridge connected rectifier diodes 74, 75, 76 and 77 and an adjustable resistor 78, the latter provided for adjustment of the bias. The bridge rectifier is connected across the inverter output at transformer secondary 53 and the output thereof to the coil 73, with resistor 78** in series.

Diodes 79, 80, 81 and 82 are series connected in an open bridge across windings 71 and 72 in magnetic amplifier fashion. The amplified output control voltage is at relatively low impedance in order to be effective in controlling the inverter diodes. Conductors 83 and 84 convey this voltage back to the inverter diodes. The former conductor goes to the common negative terminal of the inverter, which may be considered "ground," while the latter conductor connects to the several resistors 47 for the control of the several diodes 46. This control is exercised by varying the time of triggering of the inverter diodes by an algebraically added voltage.

The alternating current output of the inverter is taken from terminals 85 and 86. A coil 87 has been shown dotted thereacross, signifying a selsyn or synchronous motor, etc. for which alternating current of approximately sinusoidal waveshape is required. There is no limitation, of course, on the type of load upon my inverter.

Transformer 88 represents means for utilizing the electrical energy contained in the harmonics and there is a limitation on the load attached thereto. Harmonic circuits 54, 55, et al. may be connected directly across secondary 53 of transformer 48, but in such an event the harmonic power is dissipated in these elements. I include transformer 88 in series in this circuit and show a load 89 thereon. This load must be permanently connected and of a type insensitive to waveshape, such as incandescent lamps or resistive heating devices. This is because the combined harmonic waveshapes are quite the opposite of a sinusoidal waveshape. The load must be connected at all times so that the impedance reflected into the primary of transformer 88 will be low, thus allowing the harmonic circuits 54, 55, et al. to work at full effectiveness.

The several control circuit diodes; i. e., 60, 65, 74, 75, 76 and 77 need be only of the one watt control type. The open ended bridge diodes 79, 80, 81 and 82 should have approximately 20% of the power capacity of the inverter diodes.

The power gain of the magnetic amplifier may properly be of the order of $4\times10^3$ times.

The general mode of operation of the push-pull inverter of Fig. 6 will be understood from the circuit description given above. However, considering further the operation of the regulator, when the voltage of the A. C. output falls, for example, the rectified voltage at the adjustable contact on potentiometer 63 will likewise decrease. This causes sensing diode 65 to perform in an avalanche fashion to remove the control current from the magnetic amplifier. The latter is so biased as to cause the proper correcting voltage to be applied through resistors 47 to the inverter diodes 46 via the gate windings 71, 72 and the open end bridge rectifiers 79, 80, 81 and 82 of the magnetic amplifier. The small letters "*s*" signify the start of each winding and "F" the finish thereof as required to give the proper polarity to the several windings of the magnetic amplifier.

As has been mentioned, the frequency of operation of my inverter is almost entirely determined by the resonant frequency of the resonant circuits (49, 50 and 51, 52 in Fig. 6). There is a small secondary effect depending upon the voltage of battery 40. For the most part this is corrected by the magnetic amplifier triggering control circuit previously described. This operates as follows. As the battery voltage decreases the frequency of oscillation tends to decrease. However, the output voltage from the magnetic amplifier adds to that of battery 40 for this state of affairs. Thus, the inverter diodes are fired earlier in time than if the magnetic amplifier output were not present. A substantially constant frequency of inverter operation therefore occurs.

The shape of the output waveforms of any inverter device are of interest. A pure sine waveshape at the fundamental frequency of operation is the ideal. Some departure therefrom may most always be condoned.

In Fig. 7, waveform 90 represents that from a single-ended inverter circuit proper, such as the voltage across the resonant circuit 7, 8 in Fig. 2. It is seen that this form is relatively unsymmetrical and has an underlying sawtooth component. Waveform 91 represents that from my push-pull inverter circuit proper, such as can be noted across secondary 53 in Fig. 6. It is seen that this waveform has peaks on alternate sides of the A. C. axis and tends more toward the sinusoidal shape.

In Fig. 8 the effect of harmonic suppression circuits is shown. Waveform 94 is that at the output of a single-ended inverter having third, fifth and seventh harmonic series resonant harmonic elimination circuits; i. e., the circuit of Fig. 2 with the harmonic circuits of Fig. 6. Similarly, waveform 95 is that obtained to the right of third, fifth and seventh harmonic suppression circuits 54, 55; 56, 57; and 58, 59 in Fig. 6.

In waveshape 94 a basic triangular shape is to be noted, with some minor variations of the harmonics remaining. The harmonic content of this waveshape may be as much as forty percent. In waveform 95 the waveshape appears sinusoidal to the eye and the wave may contain of the order of one to five percent harmonics. The latter waveform is satisfactory for almost every use.

We now turn to Fig. 9, which illustrates the circuit diagram for a three phase regulated inverter. Battery 100 is the primary source of electric power in the same way as was battery 40 in Fig. 6. The voltage thereof is often of the order of 26 volts but may have any value insofar as the operation of my invention is concerned, some components being valued accordingly. The battery voltage is applied in parallel to the several phases of the circuit. Element 101 is comprised of one or more power diodes according to Fig. 4 and according to the teaching of Figs. 1 and 2 insofar as the number of diodes in series is concerned. A transformer primary 107 is in series with diode group 101 and also in series with a low ohmic value resistor 108 (variable) across the battery 100. The resistor is an adjustment for equalizing expected minor variations in the Zener power diodes. The transformer primary is tapped at a point 109, which may be anywhere within the range of from one-third to two-thirds of the winding from the end adjacent to the diodes. Capacitor 110 is connected to the tap and to the other side of the diodes. These elements 101, 107 and 110, form the relaxation oscillatory circuit described in connection with Fig. 1.

It will be understood that for three phase alternating current there must be a phase difference between the currents of each phase. This I accomplish by means of delay lines connected between the diode groups; the first, 111, being enclosed within the dashed lines shown in Fig. 9. The pulse travel with time is from left to right, as is also the increase of impedance in this type of line according to my invention. Each of the inductors 112 has approximately twice the inductance of the one preceding it; i. e., as an example, 0.05, 0.1, 0.2, 0.4, and 0.8 henrys. The capacitance of capacitors 113 has a reverse progression of values; i. e., 0.25, 0.15, 0.1, 0.08 and 0.05 microfarads. The increase of impedance tends to increase the amplitude of the voltage pulse obtained from the right hand end of the line. However, the attenuation due to inescapable losses in the components has the reverse effect. The practical result is that a slightly greater voltage output is obtained than is put in. Diode 114 is inserted so that the line will be a unilaterally conductive device for reasons to be given below.

The time delay of the delay line is made 60 electrical degrees less the small increment of time for the second diode group 102 to fire. A voltage pulse is initiated by the firing of the first diodes 101 and this initiates the positive half-cycle of phase A of the three phases. Traveling through the delay line 111 this pulse reaches diodes 102 at the correct time to initiate the negative half-cycle of phase C. Diode 114 prevents the firing of the diodes 102 from back-acting on the first diodes 101. Because of the decrease in impedance of the delay line in the backward direction I have found that diode 114 may not be required in all cases, since the backward voltage wave is decreased in amplitude and may not be sufficiently high to refire diodes 101. It will be understood that the value of the Zener avalanche voltage for each power diode is greater than the voltage impressed across it from battery 100 through the other circuit elements in series therewith, so that a voltage pulse from the delay line is required to change the diode elements from non-conducting to conducting. Tapped primary 115 and capacitor 116 coact with diode group 102 in the same manner as the corresponding elements did with diode group 101.

Referring to Fig. 10, which displays alternating voltage with time, curve 118 represents the oscillation waveform of the circuit of diode group 101 of phase A. Similarly, curve 119 represents the reversed polarity oscillation waveform of diode group 102 of phase C. The time delay between the two is because of delay line 111, of course.

In the same manner as previously described in connection with delay line 111, delay line 122 delays the voltage pulse originated from the firing of diodes 102 an amount of approximately 60 electrical degrees in order to properly fire diode group 103 and associated oscillatory circuit elements 123 and 124. This initiates the third curve of Fig. 10; i. e., 120, the positive half-cycle of phase B. This provides the three equispaced variations of electrical energy of proper polarity and phase as required for three phase operation.

The same firing-delay-firing operation is repeated for the next three sets of diodes and associated circuits, 125, 104, 126 and 127; 128, 105, 129 and 130; 131, 106, 132 and 133. Delay line 134 connects the inverter circuits in a ring, connecting from diode group 106 to 101, so that oscillatory operation, once started by closing the on-off switch 135, will be self-perpetuating.

We now consider in greater detail how the outputs of the several diode groups are phased to the three phase load. The latter is represented in Fig. 9 as a three phase delta connected inductive load, such as one or more synchronous motors, etc. The connection points are 136, 137 and 138 and the phases A, B and C. Secondary 139 is magnetically connected to primary 107, which is associated with diodes 101. This secondary and secondary 140, which is magnetically connected to primary 126 and associated with diodes 104, are connected in series and across the load connection points 136, 137 to phase A. It will be noted that the polarity of connection of secondary 140 is opposite to that of secondary 139. Secondary 139 produced a positive voltage curve; i. e., curve 118 in Fig. 10. Secondary 140 therefore produces a negative voltage curve; i. e., curve 141 in Fig. 10. Because the three phase curves 118, 119 and 120 have been initiated by other diode groups before the successively delayed pulse reached diodes 104, the phase and timing of this negative curve will be proper to continue the alternation of the first phase A from a positive to a negative half-cycle. The two half-cycles 118 and 141 do not "meet" precisely because of the relaxation nature of the diode oscillations. This aspect is corrected by means to be later described.

In a similar manner secondaries 144 and 145 are series connected to the load at points 136 and 138 to phase C. The latter secondary contributes positive half-cycle 142 of Fig. 10. Secondaries 146 and 147 are series connected at points 137 and 138 to phase B. The latter secondary contributes negative half-cycle 143. The phases are correspondingly lettered in Figs. 9, 10 and 11.

While it is now seen how my three phase inverter functions, there are additional aspects to be considered. Each of the transformers, such as the one 107—139, must be capable of handling the power passed by one diode group. This will normally be in the range of from a few to a hundred watts according to present accomplishments in the fabrication of diodes. The transformer should be of sufficiently low loss to operate at the frequency of operation chosen, say 400 cycles, and have a nominal value of "Q" effective at the primary to suitably coact with the diode group and the capacitor to provide relaxation oscillations. For a 26 volt battery and a 117 volt alternating voltage output the transformers must have a step up from primary to secondary of about 5 to 1. The capacitor, such as 110, may have a capacitance of 10 microfarads and be a good grade of low voltage rating electrolytic capacitor. By-pass capacitors 149 may have a value of 20 microfarads and a working voltage rating of 10 volts.

We now come to harmonic filtering means whereby the quasi-sinusoidal waves of Fig. 10 become the sinusoids of Fig. 11. Across each of the phases of the load there are connected series resonant circuits tuned to odd harmonics of the fundamental wave produced; i. e., across points 136—137 inductor 150 and capacitor 151 tuned to the third harmonic of the operating frequency, and inductor 152 and capacitor 153 tuned to the fifth harmonic of the operating frequency. The operation is the same as described in connection with Fig. 6, save that the energy-saving transformer has not been included. This can be included, if desired. Also, I find that in three phase inversion the suppression of the first two odd harmonics is sufficient to give a satisfactory sine wave.

In a similar manner, elements 154, 155 and 156, 157 are connected across connection points 137—138, and elements 158, 159 and 160, 161 across points 138—136 for harmonic suppression. Relatively pure sine waves 163, 164 and 165 of Fig. 11 result.

It is possible to apply automatic output voltage control (and frequency stabilization) to the circuit of Fig. 9 in much the same manner that it was applied to Fig. 6. From one phase of the harmonic suppressed load, as 137—138, input connections 97, 98 are taken for magnetic amplifier-voltage sensing and reference unit 96 in Fig. 9 in the same manner as this was accomplished in Fig. 6. The elements within the dotted lines are the same in both figures. In Fig. 9, output connection 83 therefrom connects to the negative terminal of battery 100 as did this connection to battery 40 in Fig. 6. Connection 84 connects through resistors 167 to all of the diodes as it did through resistors 47 in Fig. 6. By the latter connection the amplifier-sensing unit algebraically adds a voltage to the diodes to accomplish the regulation mentioned supra. The single regulator 96 shown is suitable for the three phase inverter of Fig. 9 as long as the three phase load is essentially balanced. If the load is unbalanced, three amplifier-sensing units are employed, one connected to each phase of the load with the output to the respectively phased diodes.

With the circuit of Fig. 9 the diodes should preferably be selected so that the Zener voltage of each is within ten percent of the others. This tolerance, or better, results in the adjusted resistance values of resistors 108 being small, thus reducing power dissipation.

Various alternate arrangements of my inverter are possible, representing different combinations of the showings of my several figures.

In Fig. 1 or 2 the harmonic elimination and/or control circuits of Fig. 6 may be included. This, in effect, substitutes the circuits of Fig. 1 or 2 for transformer 48 and all other elements to the left thereof in Fig. 6.

In Fig. 6, each of the power inverter diodes 46 may be composed of a series of three as shown in Fig. 2, or any other reasonable number may be connected in series.

In any of my embodiments a precise arrangement for voltage control of the battery (i. e., 1, 6, 40 or 100) may be arranged to maintain output voltage and frequency constant. This may take the form of a potentiometer across one cell, with the associated terminal for the battery taken as the variable arm of the potentiometer. This is a simple arrangement and thus has not been illustrated.

A vacuum tube amplifier may be utilized instead of the magnetic amplifier in Fig. 6.

Various operating ferquencies other than 400 cycles may be chosen, of which 60 and 800 cycles may be mentioned. In Fig. 9 the time delay of each of the delay lines, such as 111, would be increased for the 60 cycle alternate and decreased for the 800 cycle one, in proportion.

In Fig. 9, any number of phases may be obtained by reducing or extending the circuitry. With four octaves of the basic circuit a two phase alternating current output is obtained, with eight octaves a four phase output, and so on. Also, the load may be Y connected rather than delta connected as shown.

In Fig. 9, also, the transformers having primaries 107 and 126 may be wound in bucking relation on one core rather than two separate cores, as shown. This nullifies the slight magnetizing effect of the pre-avalanche Zener currents since these are now in opposite directions. Some reduction in the weight of the transformer for a given power output is thereby obtained. With this single core modification only one secondary is required; the bucking primaries give the phase reversal required of the two contributions to any phase of the load.

In Figs. 6 or 9 two or more inverters may be synchronized by applying either electrostatic or magnetic coupling between corresponding strings (groups) of diodes. Thus, in Fig. 6 a small capacitor from the junction H between diode 46 and resistor 45 would connect to the corresponding junction for another similar inverter. Only one such connection is required.

In Fig. 9, small capacitor 168 connects at the junction between diodes 101 and transformer primary 107 and to the corresponding junction of another similar inverter. Only one such connection is required. Furthermore, single phase and three phase inverters may also be synchronized, as by connecting the points H in both Figs. 6 and 9.

The inherent advantage of my inverter as suited for total encapsulation in all embodiments is a very great one and denotes a great forward step in this art.

Various modifications of size, proportions, shape, electrical capacity and characteristics and of similar parameters may be made without departing from the scope of my invention.

Having thus fully described my invention and the manner in which it is to be practiced, I claim:

1. An electrical power inverter for converting direct current energy to alternating current energy comprising an even-numbered plurality of similar adjacently connected solid unidirectionally conductive junction devices each having a loop electrical characteristic of current as a function of voltage, an impedance connected to said devices, said impedance having capacitative, inductive and resistive components, direct current electrical power means serially connected to each of said devices through a reactive component of said impedance to cause electrical oscillations of a given frequency therein by virtue of said loop electrical characteristic phased to produce a complete alternating current wave at said given frequency.

2. A static electrical power inverter for converting direct current energy to alternating current energy comprising an even-numbered plurality of like adjacently-connected two-terminal unidirectionally-conductive substantial working area interface devices each having an open loop electrical characteristic of current as a function of voltage, an impedance connected to said devices, said impedance having capacitative, inductive and resistive components, direct current electrical power means connected to said devices through an inductive reactance component of said impedance to cause sustained electrical oscillations of a given repetition frequency therein by virtue of said open loop electrical characteristic phased to produce an alternating current wave by waveform synthesis, a load, and additional means to cause alternating current only at the fundamental frequency of said oscillations to flow in said load.

3. A hermetically sealed static electrical inverter for changing direct current power to alternating current power comprising an even-numbered plurality of series-connected two-terminal unidirectionally-conductive junction type semiconductor devices each having an open loop hysteretic electrical characteristic of current as a function of voltage, an impedance element connected to each of said devices, each said impedance element having corresponding capacitative, inductive and resistive components, direct current electrical power means connected to each of said devices and to each of said impedance elements to cause sustained electrical oscillations of one repetition frequency therein by virtue of said open loop hysteretic electrical characteristic phased to produce an alternating current by waveform synthesis, the frequency of said oscillations corresponding to the resonant frequency of the capacitative and inductive components of said impedance element, a load, and means to cause alternating current only at the fundamental frequency of said oscillations to flow in said load.

4. A solid state electrical inverter for altering direct current electrical energy to alternating current electrical energy comprising semiconductor diodes each of substantial semiconductor active area having a hysteresis characteristic with an open loop, a capacitor in shunt to each said diode, an inductor connected to said diodes and to a source of direct current electrical energy, a second inductor magnetically coupled to said inductor to form a transformer, said diodes and said capacitor constituting a relaxation pair to form alternating electrical energy from the impressed direct polarity electrical energy, said inductor constituted and connected to alter the resulting oscillatory waveform to a quasi-sinusoidal waveform and with the capacitor to determine that a common frequency of the alternating current be produced, and further inductor-capacitor elements series connected and having resonant frequencies a multiple of the frequency of said oscillatory waveform connected in shunt to said second inductor, said further elements adapted to remove harmonic energy from said quasi-sinusoidal waveform to alter the same to essentially a sinusoidal waveform.

5. A solid state electrical inverter for altering direct current electrical energy to alternating current electrical energy comprising plural semiconductor diodes each having a hysteresis electrical characteristic with an open loop and a juxtaposed active semiconductor area, a capacitor connected to each said diode, an inductor connected to each said capacitor and diode, a source of direct current electrical energy connected to each said diode, the connected elements adapted to produce oscillations, the inductance of said inductor and the capacitance of said capacitor coactive to determine a common alernating current frequency of said oscillations, and means to time sequentially produced said oscillations to form waves of alternating current electrical energy.

6. A solid state electrical inverter for altering direct current electrical energy to alternating current electrical energy comprising plural junction silicon diodes each having a hysteresis electrical characteristic with an open loop, a capacitor connected to each said diode, a transformer winding connected to each said capacitor and diode, a source of direct current electrical energy connected to each said diode, the connected elements adapted to produce oscillations, the inductance of said transformer winding and the capacitance of said capacitor adapted to determine a common alternating current frequency of said oscillations; means to time sequentially produced said oscillations to form waves of alternating current electrical energy, and means connected to said connected elements to remove harmonic electrical energy from said waves to alter the same to approximately sinusoidal form.

7. A solid state electrical inverter for converting direct current electrical energy to alternating current electrical energy comprising plural solid state area active diodes each having an electrical characteristic with an open loop, a capacitor connected to each said diode, a winding connected to each said capacitor and diode, a source of direct current electrical energy connected to each said diode, the thus connected elements adapted to produce oscillations, the inductance of said winding and the capacitance of said capacitor adapted to determine the same alternating frequency of said oscillations for all said thus connected elements; phasing means to time sequentially produced said oscillations to form quasi-sine waves of alternating current electrical energy, means electrically connected to said connected elements to remove electrical energy at frequencies harmonically related to the fundamental frequency of said quasi-sine waves to alter the same to more nearly sinusoidal waveforms, and a regulator to raise the voltage across each said diode when the voltage of said source of direct current electrical energy falls so that the alternating voltage output shall remain approximately constant.

8. A solid state electrical inverter for converting direct current electrical energy to alternating current electrical energy comprising plural semiconductor junction diodes each having a hysteresis electrical characteristic with an open loop, a capacitor connected to each said diode, a transformer winding connected to each said capacitor and diode, a source of direct current electrical energy connected to each said diode, the thus connected elements adapted to produce sustained oscillations, the inductance of said transformer winding and the capacitance of said capacitor coactive to determine a common alternating frequency of said oscillations; phasing means to time sequentially produced said oscillations to form quasi-sine waves of alternating current electrical energy, and plural filter means electrically connected to said connected elements to remove electrical energy at frequencies harmonically related to the fundamental frequency of said quasi-sine waves to alter the same to more nearly sinusoidal waveforms, and an electrical regulator having voltage sensing and reference components to raise the voltage across each said diode when the voltage of said source of direct current electrical energy decreases so that the alternating voltage output shall remain substantially constant.

9. A hermetically sealed solid state electrical inverter for converting direct current electrical energy to alternating current electrical energy comprising plural junction diodes each having a hysteresis electrical characteristic with an open loop, a capacitor connected to each said diode, a transformer winding connected to each said capacitor and to each diode also, a source of direct current electrical energy connected to each said diode through a resistor, the thus connected elements adapted to produce relaxation oscillations, the inductance of said transformer winding and the capacitance of said capacitor adapted to determine a common alternating frequency of said relaxation oscillations; phasing means to time sequentially produced relaxation said oscillations to form quasi-sine waves of alternating current electrical energy, plural filter means electrically connected to said connected elements to remove electrical energy at frequencies harmonically related to the fundamental frequency of said quasi-sine waves to alter the same to more nearly sinusoidal waveforms, and a magnetic amplifier regulator having voltage sensing and reference components to raise the voltage across each said diode when the voltage of said source of direct current electrical energy decreases to that the alternating voltage output shall remain substantially constant.

10. An electrical inverter for converting direct current electrical energy to alternating current electrical energy comprising even-number plural groups of semiconductor junction diodes each having a hysteresis-like electrical characteristic, electrical charge-accumulating means connected to each said diode group, inductive means connected to each said charge-accumulating means, a source of direct current electrical energy connected to each diode group, the thus connected elements adapted to produce oscillations of the same frequency but of different phase for each group, at least one resonant circuit tuned to harmonics of said frequency of oscillation, said circuit connected to said inductive means, rectifying means also connected to said inductive means to provide a potential proportional to the amplitude of the oscillations of said inductive means, amplifying means connected to said rectifying means to provide an amplified electrical output according to the amplitude of said oscillations, the output of said amplifying means connected to said diodes to maintain the alternating electrical output of the inverter approximately constant.

11. A single phase push-pull electrical inverter for converting direct current electrical energy to alternating current electrical energy comprising two groups of parallel-connected semiconductor diodes each having an electrical characteristic with an open loop and an active area of adjacently disposed semiconductors, a capacitor connected to each diode group, a transformer having two primaries and one secondary, one said primary connected to each said capacitor, a source of direct current electrical energy connected to each diode, the thus connected elements adapted to produce oscillations of a given frequency, plural series resonant circuits tuned to harmonics of the frequency of said oscillation connected to the secondary of said transformer, a rectifier combination also connected to the secondary of said transformer to provide a potential proportional to the amplitude of the alternating voltage of said secondary, a bias rectifier also connected to said secondary, an amplifier, the voltage outputs of said combination and said bias rectifier connected to the input of said amplifier to proportion the output thereof according to the amplitude of said alternating voltage, the output of said amplifier connected to said diodes through resistors to raise the voltage across each said diode when the voltage of said source of direct current electrical energy decreases thereby maintaining the alternating electrical output of said inverter substantially constant.

12. A single-phase push-pull electrical inverter for converting direct current electrical energy to alternating current electrical energy comprising two groups of parallel-connected silicon junction diodes each having a hysteresis current versus voltage electrical characteristic with an open loop, a capacitor connected to each said diode group, a transformer having two primaries and one secondary, one primary of said transformer connected to each said capacitor, a source of direct current electrical energy connected to each diode through a resistor, the thus-connected elements adapted to produce relaxation oscillations having a common frequency determined by the capacitance of one said capacitor and the inductance of one said transformer primary connected thereto; plural series resonant circuits tuned to harmonics of said frequency of oscillation, said circuits connected in parallel across the secondary of said transformer, a rectifier-filter combination also connected across the secondary of said transformer to provide a direct potential proportional to the amplitude of the alternating voltage of said secondary, a bias rectifier also connected across said secondary, a magnetic amplifier, the voltage outputs of said combination and of said bias rectifier connected to the input of said magnetic amplifier to proportion the output thereof according to the amplitude of said alternating voltage, the output of said magnetic amplifier connected to each said diode through a separate resistor to raise the voltage across each said diode when the voltage of said source of direct current electrical energy decreases, thereby to maintain the alternating output voltage and the frequency of operation of said inverter substantially constant.

13. An inverter for converting direct current electrical energy to alternating current electrical energy comprising plural semi-conductor diodes having open loop electrical characteristics and an area of contacting semiconductor active material, positive and negative electrically reactive means connected to each said diode, a source of direct current electrical energy connected to each said diode, the thus connected elements adapted to produce electrical oscillations at a common frequency, an electrical load, means coactive with one diode-reactive means group connected to said load to initiate one polarity of alternating electrical energy in said load, electrical time delay means connected to the first said group and to a second group, said second group adapted to initiate another polarity of electrical energy in said load at a later time with respect to that of the first said group, and at least one more delay means connected to the last group and to the first said group to maintain said inverter in operation.

14. A plural phase inverter for converting direct current electrical energy to alternating current electrical energy comprising plural semiconductor diodes each having an electrical characteristic with an open loop, charge-accumulating means connected to each said diode, inductive means connected to each said diode, a source of direct current electrical energy connected to each said diode, the thus connected elements adapted to produce electrical oscillations of a given frequency, an electrical load, means coactive with one diode, charge-accumulating and inductive means group connected to said load to initiate one polarity of electrical energy in said load, electrical time delay means connected to the first said group and to a second similar group, said second group adapted to initiate the opposite polarity of electrical energy in said load at a time-displaced phase with respect to that of the first said group, and at least one more delay means connected to the last group and to the first said group to maintain said inverter in operation.

15. A plural phase electrical inverter for converting unidirectional voltage electrical energy to alternating voltage electrical energy comprising plural area-conductive semiconductor diodes each having an electrical characteristic with an open loop, a capacitor connected to each diode, a primary inductor connected to each said capacitor and to each said diode, an electrical energy source of unidirectional voltage connected to each said diode, the thus connected elements adapted to produce electrical oscillations of a given frequency, one delay line connected between the first and the second of said diodes, a plural phase load circuit, a secondary inductor magnetically related to the primary inductor of the first said diode connected to said load circuit to initiate a positive half-cycle of electrical voltage on one phase, a second secondary inductor magnetically related to the primary inductor of the second said diode connected to said load circuit to initiate a negative half-cycle of voltage on another phase, and other delay lines connected to further diodes and inductor secondaries magnetically related to inductor primaries connected to diodes to complete a cycle of each of the plural phases of said inverter, and another delay line connecting the last diode to the first said diode to provide continuous inverter operation; plural circuits resonant to harmonics of the frequency of operation of said inverter connected to the load thereof, and a regulator connected to each said diode to maintain said inverter alternating voltage output amplitude and frequency approximately constant.

16. A three phase electrical inverter for converting direct current electrical energy to alternating current electrical energy comprising plural groups of connected semiconductor area type diodes each having an electrical characteristic with an open loop, a capacitor connected to each diode group, a transformer primary connected to each said capacitor and to each said diode group, a source of direct current electrical energy connected to each said diode group, the thus connected elements adapted to produce sustained oscillations at a common frequency; one delay line connected between the first and the second of said diode groups, a load circuit, a transformer secondary magnetically connected to the primary of the first said diode group, said secondary connected to said load circuit to initiate a positive half-cycle of electrical voltage on phase one, another secondary magnetically connected to the primary of the second said diode group, said other secondary connected to said load circuit to initiate a negative half-cycle of voltage on phase three, a second delay line connected between the second and third of said diode groups, still another transformer secondary magnetically connected to the primary of the third said diode group, said still other secondary connected to said load circuit to initiate a positive half-cycle of voltage on phase two, three more delay lines connected to further diode groups and primaries, transformer secondaries magnetically connected to the primaries thereof to complete a cycle of each of said three phases, and a sixth delay line connecting the last of said diode groups to the first said diode group to provide continuous inverter operation.

17. A hermetically sealed three phase solid state electrical inverter for converting direct electric energy to alternating electrical energy comprising six groups of series connected junction silicon diodes each having a hysteresis electrical current versus voltage characteristic with an open loop, a capacitor connected to each diode group, a transformer primary connected to each said capacitor and to each said diode group, a source of direct current electrical energy connected to each said diode group through a resistor, the thus connected elements adapted to produce relaxation oscillations, the inductance of said transformer primary and the capacitance of said capacitor coactive to determine the alternating frequency of said relaxation oscillations; one delay line connected between the first and the second of said diode groups having a time delay of sixty electrical degrees of said alternating frequency, transformer secondaries magnetically connected to each said transformer primary, a three phase load circuit, a first transformer secondary magnetically connected to the primary of the first said diode group, said first secondary connected to said load circuit to initiate a positive half-cycle of electrical voltage on phase one, a second secondary magnetically connected to the primary of the second diode group, said second secondary connected to said load circuit to initiate a negative half-cycle of voltage on phase three, a second similar delay line connected between the second and third of said diode groups, a third transformer secondary magnetically connected to the primary of the third said diode group, said third secondary connected to said load circuit to initiate a positive half-cycle of voltage on phase two, three more similar delay lines connected to further diode groups to complete a cycle of each of the three phases of said inverter, and a sixth delay line connecting the last said diode group to the first said diode group to provide continuous inverter operation, three more transformer secondaries magnetically connected to primaries and to said load to provide voltages of opposite polarity to the first three said voltages; plural circuits resonant to harmonics of the frequency of operation of said inverter connected to each phase of the load thereof to remove such harmonics from electrical energy energizing said load, and a magnetic amplifier regulator having voltage sensing and reference components to raise the voltage across each said diode group when the voltage of said source decreases so that the alternating voltage output of said inverter shall remain substantially constant.

References Cited in the file of this patent

FOREIGN PATENTS 158,879 Australia -------------- Sept. 16, 1954

OTHER REFERENCES

Pamphlet: "40 Uses for Germanium Diodes," published by Sylvania Electric Products, Inc. dated March 11, 1952; page 34 and Figs. 3–15.

Article: "Negative Resistance in Germanium Diodes," by Kauke, pages 8–10 of Radio-Electronic Engineering for April 1953.

Article: "Germanium Diode Oscillator," by Gottleib; pages 55, 106–107 of Radio and Television News for May 1955.